(12) United States Patent
Tofts

(10) Patent No.: US 10,270,883 B2
(45) Date of Patent: Apr. 23, 2019

(54) SCHEDULING DOWNLOADS

(71) Applicant: Hewlett Packard Enterprise Development LP, Houston, TX (US)

(72) Inventor: Chris Tofts, Bristol (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 133 days.

(21) Appl. No.: 15/119,508

(22) PCT Filed: Mar. 27, 2014

(86) PCT No.: PCT/EP2014/056239
§ 371 (c)(1),
(2) Date: Aug. 17, 2016

(87) PCT Pub. No.: WO2015/144234
PCT Pub. Date: Oct. 1, 2015

(65) Prior Publication Data
US 2017/0013081 A1    Jan. 12, 2017

(51) Int. Cl.
*H04L 29/08* (2006.01)
*H04L 12/26* (2006.01)

(52) U.S. Cl.
CPC .......... *H04L 67/32* (2013.01); *H04L 43/0894* (2013.01); *H04L 67/1097* (2013.01); *H04L 67/2842* (2013.01)

(58) Field of Classification Search
CPC . H04L 43/0894; H04L 67/32; H04L 67/1097; H04L 67/2842
See application file for complete search history.

(56) References Cited

U.S. PATENT DOCUMENTS

| | | | | |
|---|---|---|---|---|
| 5,991,306 A | * | 11/1999 | Burns | .............. G06F 17/30902 370/429 |
| 7,035,907 B1 | * | 4/2006 | Decasper | ............... H04L 67/06 709/212 |
| 7,912,921 B2 | * | 3/2011 | O'Rourke | .............. H04L 29/06 709/219 |

(Continued)

FOREIGN PATENT DOCUMENTS

| | | | | |
|---|---|---|---|---|
| AU | 2010276462 B1 | * | 1/2012 | ....... G06F 17/30902 |
| CA | 2720087 A1 | * | 10/2009 | .......... H04L 61/609 |

(Continued)

OTHER PUBLICATIONS

International Searching Authority, "Notification of Transmittal of the International Search Report and the Written Opinion", PCT/EP2014/056239, dated Jul. 21, 2014, 10 pages.

(Continued)

*Primary Examiner* — Kostas J Katsikis
(74) *Attorney, Agent, or Firm* — Hewlett Packard Enterprise Patent Department

(57) ABSTRACT

A method comprises instructing a first endpoint to download a first part of a content package when it is determined that the first part of the content package is not cached in a content delivery network; and instructing a second endpoint, different from the first endpoint, to download the first part of the content package when it is determined that a predetermined amount of the first part of the content package is cached in the content delivery network.

20 Claims, 6 Drawing Sheets

(56) References Cited

U.S. PATENT DOCUMENTS

| | | | | |
|---|---|---|---|---|
| 8,370,420 B1* | 2/2013 | Decasper | ............ | G06F 17/30902 709/202 |
| 8,370,452 B2 | 2/2013 | Harvell et al. | | |
| 9,628,352 B2* | 4/2017 | Xu | ....................... | H04L 41/509 |
| 9,641,640 B2* | 5/2017 | Flack | ................. | H04L 67/2842 |
| 9,648,125 B2* | 5/2017 | Flack | ................. | H04N 21/23106 |
| 9,756,142 B2* | 9/2017 | Dey | .................... | H04L 67/2842 |
| 2002/0095687 A1* | 7/2002 | Shintani | ............. | H04N 7/17318 725/112 |
| 2003/0065743 A1* | 4/2003 | Jenny | ..................... | H04L 29/06 709/219 |
| 2003/0069964 A1* | 4/2003 | Shteyn | .................... | H04L 29/06 709/225 |
| 2003/0204602 A1* | 10/2003 | Hudson | ................. | D01D 5/423 709/228 |
| 2005/0223165 A1* | 10/2005 | Schmidt | .............. | G06F 12/0866 711/113 |
| 2006/0064476 A1* | 3/2006 | Decasper | .......... | G06F 17/30902 709/223 |
| 2007/0127440 A1* | 6/2007 | Narayanaswami | ..... | H04L 69/04 370/352 |
| 2007/0192474 A1* | 8/2007 | Decasper | ............. | H04L 67/306 709/223 |
| 2008/0133830 A1* | 6/2008 | Nitta | ....................... | G06F 3/061 711/113 |
| 2008/0235360 A1* | 9/2008 | Li | ..................... | G06F 17/30902 709/223 |
| 2008/0281872 A1* | 11/2008 | Mizuno | ................ | G11B 27/034 |
| 2009/0113024 A1* | 4/2009 | Verma | ............... | H04L 29/06027 709/219 |
| 2010/0325364 A1* | 12/2010 | Chen | ................... | G06F 12/0802 711/135 |
| 2011/0225311 A1* | 9/2011 | Liu | ....................... | H04L 45/125 709/231 |
| 2011/0225312 A1* | 9/2011 | Liu | ........................ | H04L 12/18 709/231 |
| 2011/0302618 A1* | 12/2011 | Odlund | .............. | H04N 21/2183 725/109 |
| 2013/0144994 A1* | 6/2013 | Li | ..................... | G06F 17/30864 709/220 |
| 2013/0173817 A1* | 7/2013 | Field | ................... | H04L 65/4076 709/231 |
| 2013/0179541 A1 | 7/2013 | Chen | | |
| 2013/0254815 A1* | 9/2013 | Pfeffer | ............. | H04N 21/25891 725/96 |
| 2013/0263176 A1 | 10/2013 | Xiong et al. | | |
| 2014/0067913 A1* | 3/2014 | von Haden | ......... | H04L 67/2852 709/203 |
| 2014/0115124 A1* | 4/2014 | Xu | ....................... | H04L 65/1083 709/219 |
| 2014/0280679 A1* | 9/2014 | Dey | .................... | H04L 67/2842 709/213 |
| 2014/0337472 A1* | 11/2014 | Newton | .................. | H04L 67/32 709/217 |
| 2014/0344391 A1* | 11/2014 | Varney | .................... | H04L 41/50 709/213 |
| 2014/0344401 A1* | 11/2014 | Varney | ................ | H04L 67/1097 709/217 |
| 2014/0379639 A1* | 12/2014 | Gasser | ................ | G06F 11/1448 707/610 |
| 2014/0379837 A1* | 12/2014 | Gasser | ................ | H04L 67/2847 709/213 |
| 2015/0100660 A1* | 4/2015 | Flack | ................ | H04N 21/23106 709/213 |

FOREIGN PATENT DOCUMENTS

| | | | |
|---|---|---|---|
| WO | WO-2012091693 A1 * | 7/2012 | ....... H04L 29/08729 |
| WO | WO-2013091172 | 6/2013 | |

OTHER PUBLICATIONS

Ni, J. et al., "Large-Scale Cooperative Caching and Application-Level Multicast in Multimedia Content Delivery Networks", (Research Paper), May 2005, 8 pages.

* cited by examiner

SCHEDULING DOWNLOADS

BACKGROUND

A content delivery network or content distribution network (CDN) is a distributed system of servers which are deployed in multiple data centers across the internet using multiple backbones. CDNs are utilized to distribute content to endpoints on behalf of content providers. In a typical example, a content provider, such as an ecommerce company, will utilize a CDN to reduce demand on their own data centers and/or origin servers. Use of a CDN in this manner therefore improves availability of content by offloading traffic from the content provider's infrastructure to the CDN infrastructure. In this example, the content provider enters a contractual arrangement with a commercial CDN operator, to provide content caching. In further examples, the CDN may be built and operated by an internet service provider (ISP), a third party, or by the content provider itself (e.g. Netflix Open Connect).

BRIEF DESCRIPTION OF THE DRAWINGS

Various features and advantages of the present disclosure will be apparent from the detailed description which follows, taken in conjunction with the accompanying drawings, which together illustrate, by way of example only, features of the present disclosure, and wherein.

DETAILED DESCRIPTION

Figure 1:
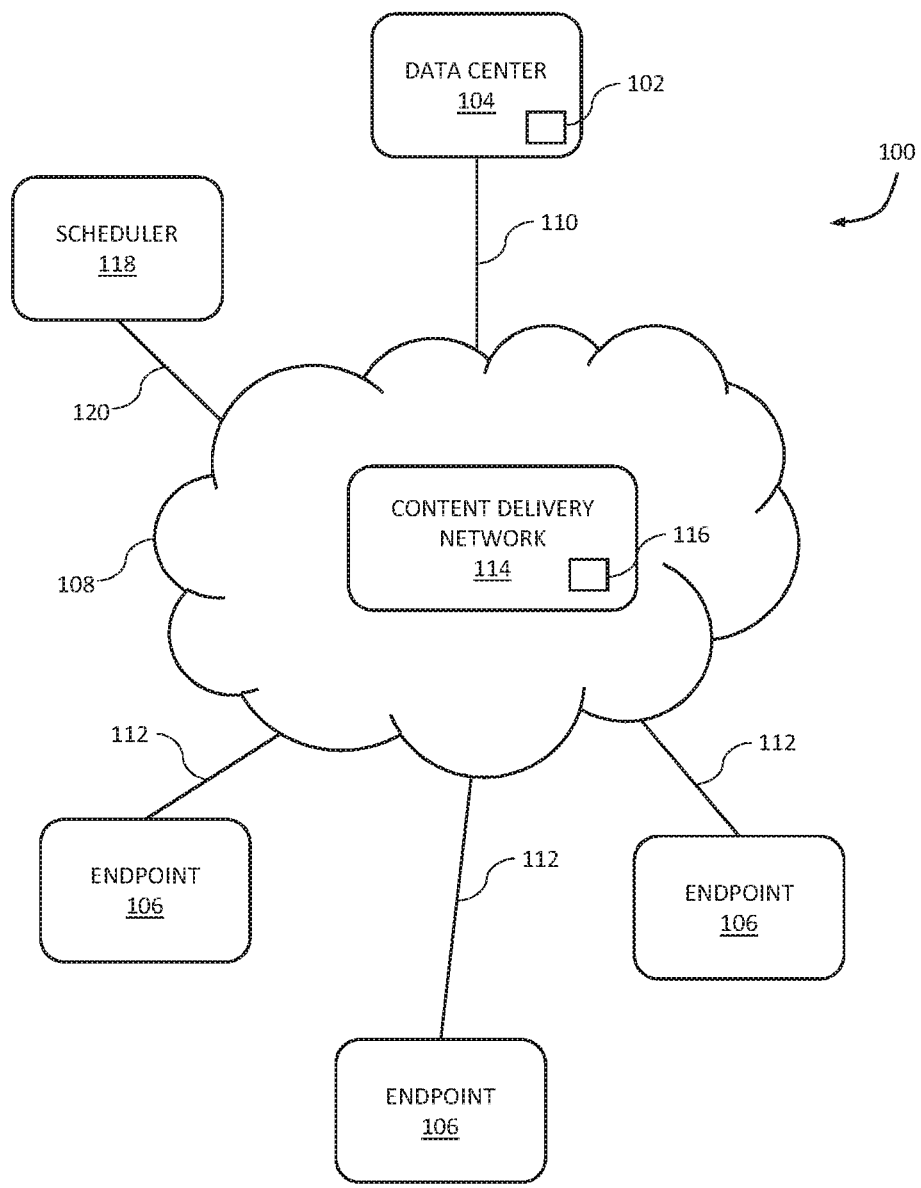
FIG. 1 is a schematic diagram showing an example of a system for delivering content to a plurality of endpoints.

FIG. 1 shows a system 100 for delivery of a content package 102 from a data center 104 operated by a content provider (not shown) to a plurality of endpoints 106 over the communications network 108, such as the Internet. The data center 104 and the plurality of endpoints 106 communicate over the communications network 108 using one or more protocols, such as those provided by the Internet protocol suite.

Typically, the data center 104 is communicatively coupled to the communications network 108 via a relatively high-bandwidth enterprise-grade communications link 110, such as a fiber optic link or similar. In contrast, the plurality of endpoints 106 are communicatively coupled to the communications network 108 via relatively low bandwidth consumer-grade communications links 112, such as a DSL link or similar (e.g. ADSL). Thus, in a normal use scenario (i.e. unscheduled and effectively random requests from the endpoints 106) the bandwidth of communications link 110 to the data center 104 is normally sufficient to meet the download demands of the plurality of endpoints 106. Nevertheless, in the case where each of the endpoints 106 requests content from the data center 104 at substantially the same time, the bandwidth of the communication link 110 to the data center may rapidly saturate, thus leading to poor download performance. A typical example of this latter scenario is scheduled simultaneous distribution of high definition audiovisual content to a large number of endpoints (e.g. cinemas), where delivery of the content must be completed in a relatively short timeframe.

In order reduce data traffic on communications link 110 to the data center 104 and thereby improve availability of the content package 102 to the plurality of endpoints 106, the content provider distributes the content package 102 via a content delivery network (CDN) 114. The CDN 114 caches content downloaded from the data center and makes it available to the plurality of endpoints 106 by distributing the content to a plurality of nodes (e.g. servers) across the CDN 114. In FIG. 1, the cached content is shown schematically in a cache 116, but it will be appreciated that the content may be cached independently at each of the plurality of nodes distributed and across a large geographical extent.

When an endpoint requests the content package 102 from the data center 104 (e.g. identified by hostname), the CDN 114, which is "in path", intercepts the request and determines whether the requested content is cached in the CDN 114. If the content is cached in the CDN 114, the CDN 114 redirects the request to a CDN node which is closest to the requesting endpoint (e.g. in terms of backbone distance), and that node returns the content to the requesting endpoint. If the content is not cached in the CDN 114, the CDN 114 retrieves the content from the data center 104 for caching, and delivers the content to the requesting endpoint. Thus, the content is made available in the CDN 114 for subsequent requests from the plurality of endpoints 106, thereby avoiding further impact on the communications link 110 to the data center 104. If the plurality of endpoints 106 simultaneously request content which is not cached in the CDN 114, the CDN 114 will submit a plurality of corresponding requests to the data center 104 for the content. Moreover, in this scenario the requests from the plurality of endpoint 106 may return to the data center 104 without being intercepted by the CDN 114. Accordingly, where the plurality of endpoints 106 is large, these simultaneous requests have the potential to saturate the communications link 110 to the data center 104, thereby leading to poor download performance.

In order to address the potential problems discussed above, system 100 further includes a scheduler 118 which is also communicatively coupled to the communications network 108 via a communications link 120. The scheduler 118 interacts with the endpoints to initiate and control downloading of the content package 102 from the data center 104 by sending and receiving messages across the communications network 108. Moreover, the scheduler 118 is configured to instruct the plurality of endpoints 106 according to a schedule which ensures that the bandwidth of communications link 110 is used in an efficient manner and saturation is avoided. In a similar manner, the plurality of endpoints typically report download status for the content to the scheduler 118 over the communications network 108, such that the scheduler can determine the current download status for the content at each endpoint 106. Control of the endpoints 106 by the scheduler 118 in this manner is facilitated by an appropriate application programming interface (API) exposed to the scheduler over the communications network 108.

In a typical example, the content package 102 is a high-definition audiovisual content package, such as a digital cinema package (DCP) as defined by Digital Cinema Initiatives, LLC. Content packages of this nature may be several hundred gigabytes in size (in the case of a high-definition movie), or even one or more terabytes in size (in the case of a three-dimensional high-definition high frequency multiple territory movie), and may require distribution to several thousand endpoints. In this context, an endpoint may be a network attached storage (NAS) appliance, a server, or a cinema projection system installed in a cinema. As discussed above, distribution of content of this nature has the potential to rapidly saturate communication link 110 to the data center 104, therefore preventing timely distribution of the content, or necessitating a very high bandwidth and expensive communications link 110 from the data center 104 to the communications network 108.

Figure 2:
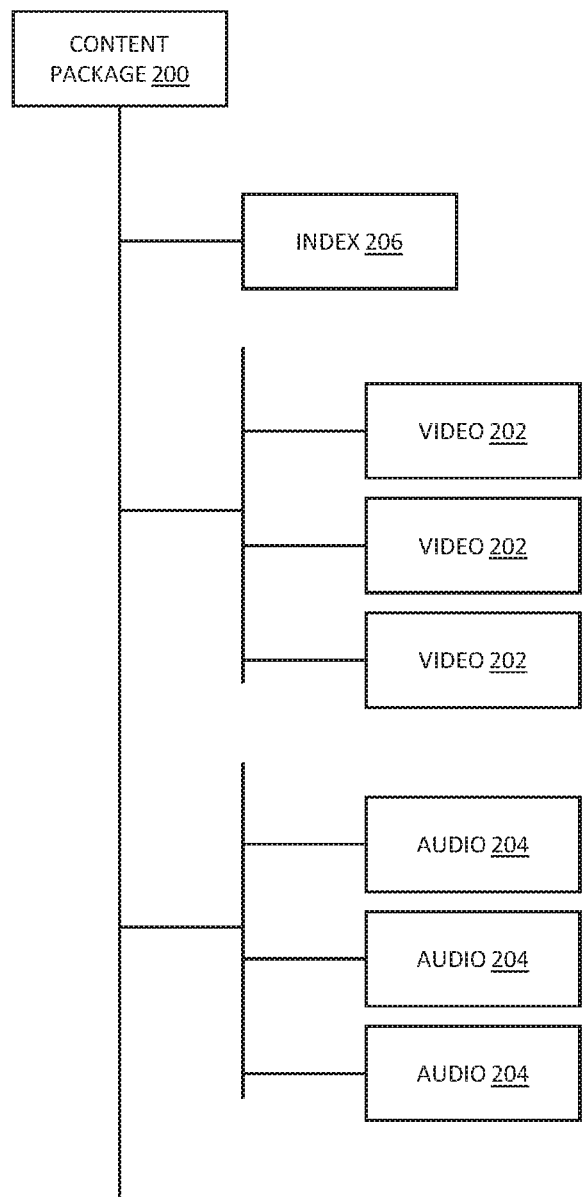
FIG. 2 is a schematic diagram showing an example of a content package for delivery to a plurality of endpoints.

The basic structure of a typical DCP 200 for distribution via the system 100 of FIG. 1 is shown schematically in FIG. 2. In this example, DCP 200 comprises a plurality of video streams 202 and a plurality of audio streams 204 which are typically provided in separate files according to the Material eXchange Format (MXF). The DCP 200 also includes one or more index files 206 which describe the content of the DCP 200 using eXtensible Markup Language (XML). Typically, the video and audio streams 202, 204 in the MXF files are compressed and encrypted, in order to reduce the amount of storage space required and to protect from unauthorized use (e.g. piracy). For example, the video streams may be compressed according to the JPEG 2000 standard, whereas the audio streams may be stored in an uncompressed state, using a format such as linear PCM. Encryption may be achieved using an encryption standard such as the advanced encryption standard (AES). As discussed above, a typical DCP for a high-definition movie will be several hundred gigabytes in size, with each video stream being several tens of gigabytes.

Figure 3:
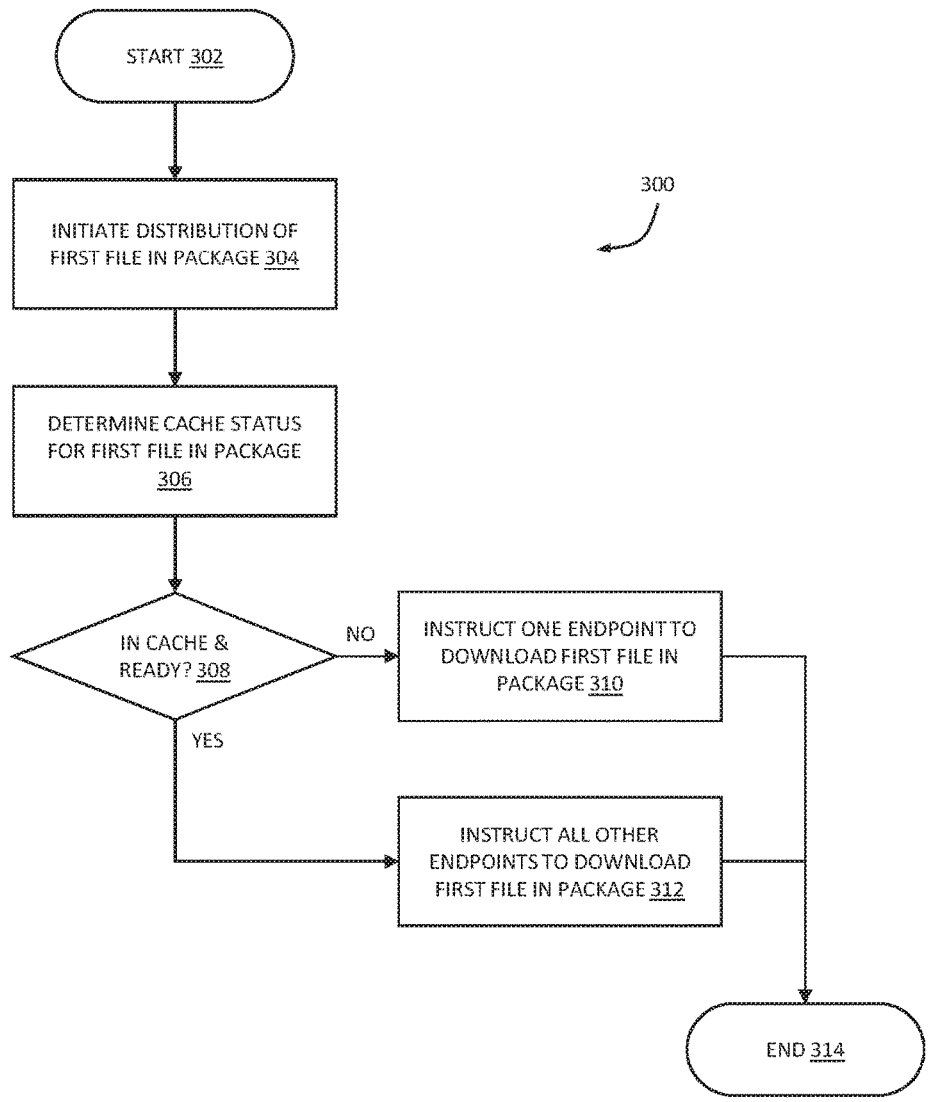
FIG. 3 is a flow chart showing an example of a method of scheduling a download of a content package to a plurality of endpoints.

FIG. 3 is a flow diagram showing a general method 300, performed by the scheduler 118 of FIG. 1, for efficient scheduling of downloads or distribution of a file in the content package 102 by the plurality of endpoints 106. First, the scheduler 118 initiates distribution of a first file in the content package 102 (step 304). This step may, for example, be performed in response to a message from the data center 104 indicating that the content package 102 has been made available for downloading and providing details of the contents of the content package 102 and the endpoints 106 to which it is to be distributed. Next, the scheduler 118 determines the status of the CDN 114 with respect to the first file in the content package 102 (step 306). In this example, in order to determine the status of CDN 114 in respect of the file, the scheduler 118 typically assumes that the behavior of the CND 114 may be modelled as a cache 116. Thus, if the scheduler 118 determines that a file in the content package 102 has been successfully downloaded via the CDN 114 to one of the endpoints 106, it assumes that the file is stored in the cache 116 and thus available for further downloads from the CDN 114.

Determination of the status of the cache 116 is typically performed on the basis of status messages received at the scheduler 118 from the plurality of endpoints 106. For example, prior to distribution of the content package, the scheduler 118 will assume that the first file is not cached in the cache 116; conversely, once the scheduler 118 receives a status message from at least one of the endpoints 106 indicating that the first file has been downloaded, the scheduler 118 will assume that the file is stored in the cache 116 and is available for download from the CDN 114. The status messages received at the scheduler 118 from the endpoints 106 may also indicate the progress made in respect of downloading a file, such as percentage downloaded, percentage to completion, or current download speed.

If the scheduler 118 determines the first file is not stored in the cache 116 and thus not available for downloading from the CDN 114 (step 308), the scheduler 118 sends a message to a first endpoint in the plurality of endpoints 106 to instruct the first endpoint to download the file via the CDN 114 (step 310). Conversely, if the scheduler 118 determines that the first file is stored in the cache 116 and thus available for downloading from the CDN 114 (step 308), the scheduler 118 sends a message to all remaining endpoints in the plurality of endpoints 106 (i.e. those endpoints which have not yet downloaded the file) to instruct them to download the file via the CDN 114 (step 312).

Method 300 of FIG. 3 ensures that the CDN 114 only downloads the file in the content package 102 from the data center 104 once (at step 310), thereby minimizing load on the data center 104 and optimizing use of communications link 110. Once the file has been downloaded once, the scheduler 118 assumes that the file is available for downloading from the CDN 114 by the remaining endpoints. Thus, the method 300 of FIG. 3 ensures that the resources of CDN 114 are utilized, whilst minimizing the load on the data center 104 and its associated communications link 110.

Figure 4:
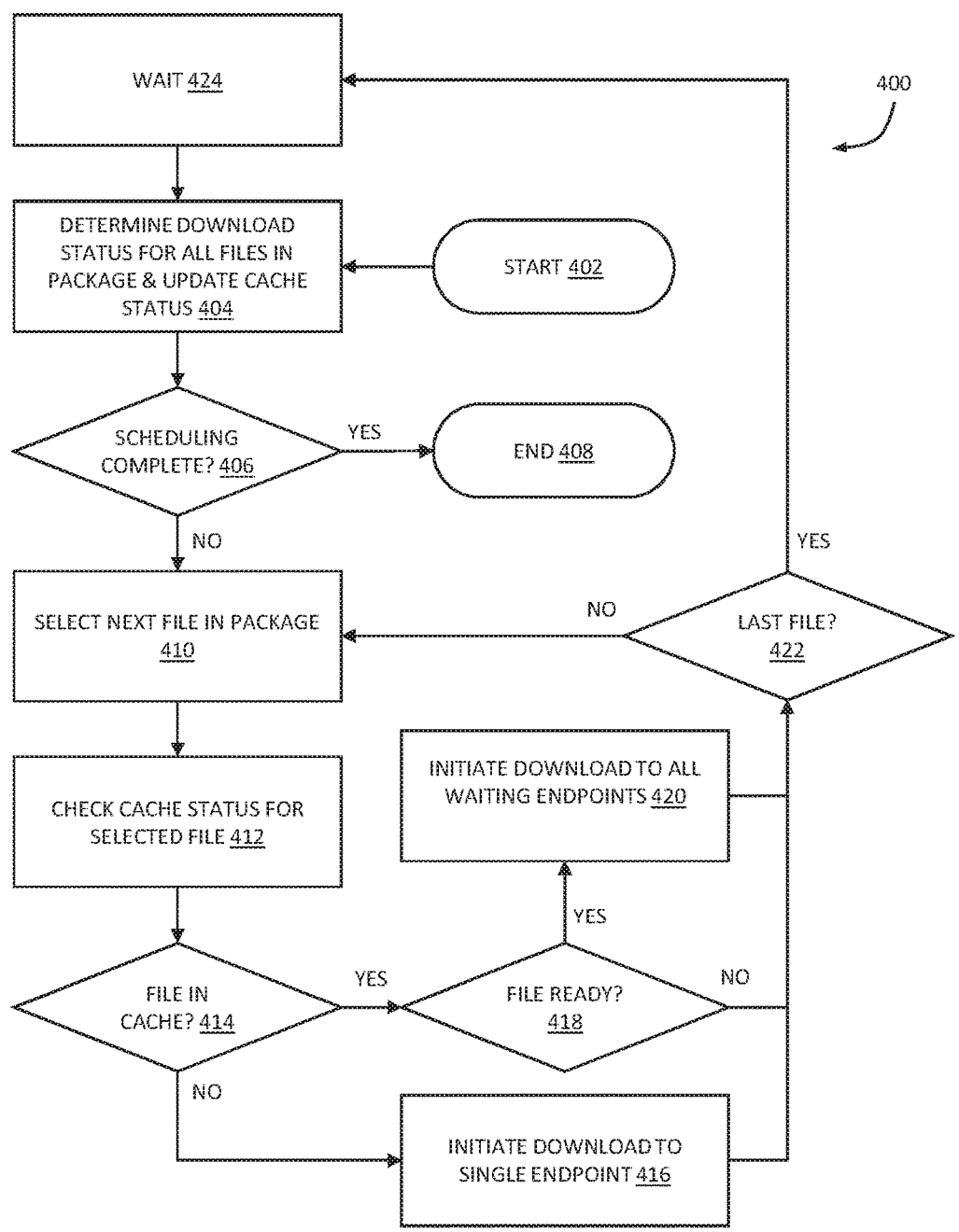
FIG. 4 is a flow chart showing a further example of a method of scheduling a download of a content package to a plurality of endpoints.

FIG. 4 shows a method 400 performed by the scheduler 118 of FIG. 1, for scheduling downloading or distribution of a plurality of files in a content package 102, based on the general method 300 of FIG. 3. In the following description, a file which has been scheduled for download by each of the endpoints 106 is termed a "scheduled file" whereas a file which has not yet been scheduled for download by each of the endpoints 106 is termed an "unscheduled file". Similarly, a file which has been downloaded by each of the endpoints 106 is termed a "delivered file" whereas a file which has not yet been downloaded by each of the endpoints 106 is termed an "undelivered file". Analogous terminology applies in respect of the content package 102 in the form of a "scheduled content package" (i.e. a content package for which all files are scheduled files) and a "delivered content package" (i.e. a content package for which all files are delivered files).

According to method 400, the scheduler 118 first determines the status of cache 116 in respect of each file in the content package 102 (step 404). As with the method 300 of FIG. 3, this determination is typically performed on the basis of status messages received at the scheduler 118 from the plurality of endpoints 106. Next, the scheduler 118 determines whether scheduling of the content package 102 is complete (i.e. is the content package 102 a scheduled content package?) based on the received status messages (step 406) and, if complete (i.e. "YES" at step 406), the method ends (step 408). If one or more files in the content package 102 are unscheduled files (i.e. "NO" at step 406), the scheduler 118 selects a first file in the one or more unscheduled files for scheduling (step 410). Next, the scheduler 118 checks the status of the cache 116 in respect of the selected file (step 412) and determines if some or all of the file is in the cache (step 414). If it is determined that the file is not in the cache (i.e. "NO" at step 414), the scheduler sends a message to one of the plurality of endpoints 106 to instruct that endpoint to start downloading the selected file (step 416).

Alternatively, if it is determined that some or all of the selected file is stored in the cache (i.e. "YES" at step 414), the scheduler proceeds to determine whether the file is ready to be downloaded from the cache (step 418). This determination may, for example, be based on one or more conditions specifying a predetermined minimum amount of a file (e.g. a minimum percentage) which must be present in the cache 116 before the selected file is ready for downloading from the CDN 114 by the plurality of endpoints 106. If the scheduler 118 determines that the selected file is ready for downloading from the CDN 114 (i.e. "YES" at step 418), the scheduler sends messages to each of the waiting endpoints to instruct them to start downloading the selected file (step 420).

The predetermined minimum amount mentioned above should be selected to avoid or minimize the probability of a "catch up" event occurring between two or more of the endpoints 106. Such an event can occur when an endpoint instructed at step 420 of method 400 downloads the file faster than the endpoint instructed at step 416 of method 400, to the extent that the endpoint instructed at step 420 "catches" the endpoint instructed at step 416. A "catch up" event of this nature can have a detrimental effect on the download speeds for all endpoints in respect of the file. Thus, if a conservative approach is desired, the predetermined minimum amount may be set to 100 percent. Alternatively, a minimum amount less that 100 percent may be chosen to improve overall download performance at the costs of increased likelihood of a "catch up" event. In this latter scenario, the minimum amount may, for example, be determined on the basis of information regarding the relative bandwidths of the communications links 112 to the endpoints 106.

After steps 416 and 420, the scheduler determines if the selected file is the last unscheduled file in the content package 102 (step 422). If the current file is not the last unscheduled file (i.e. "NO" at step 422), the scheduler returns to step 410, selects the next unscheduled file and proceeds to step 412 as discussed above. If the current file is the last unscheduled file in the package (i.e. YES at step 422), the scheduler waits a predetermined time period (step 424), or waits for a message from one of the endpoint indicating the downloading of a file is complete, before returning to step 404. For example, the predetermined time period may be based on the shortest anticipated completion time for a current download, thus ensuring that the endpoint idle time (i.e. time when an endpoint is not downloading data) is minimized.

Figure 5:
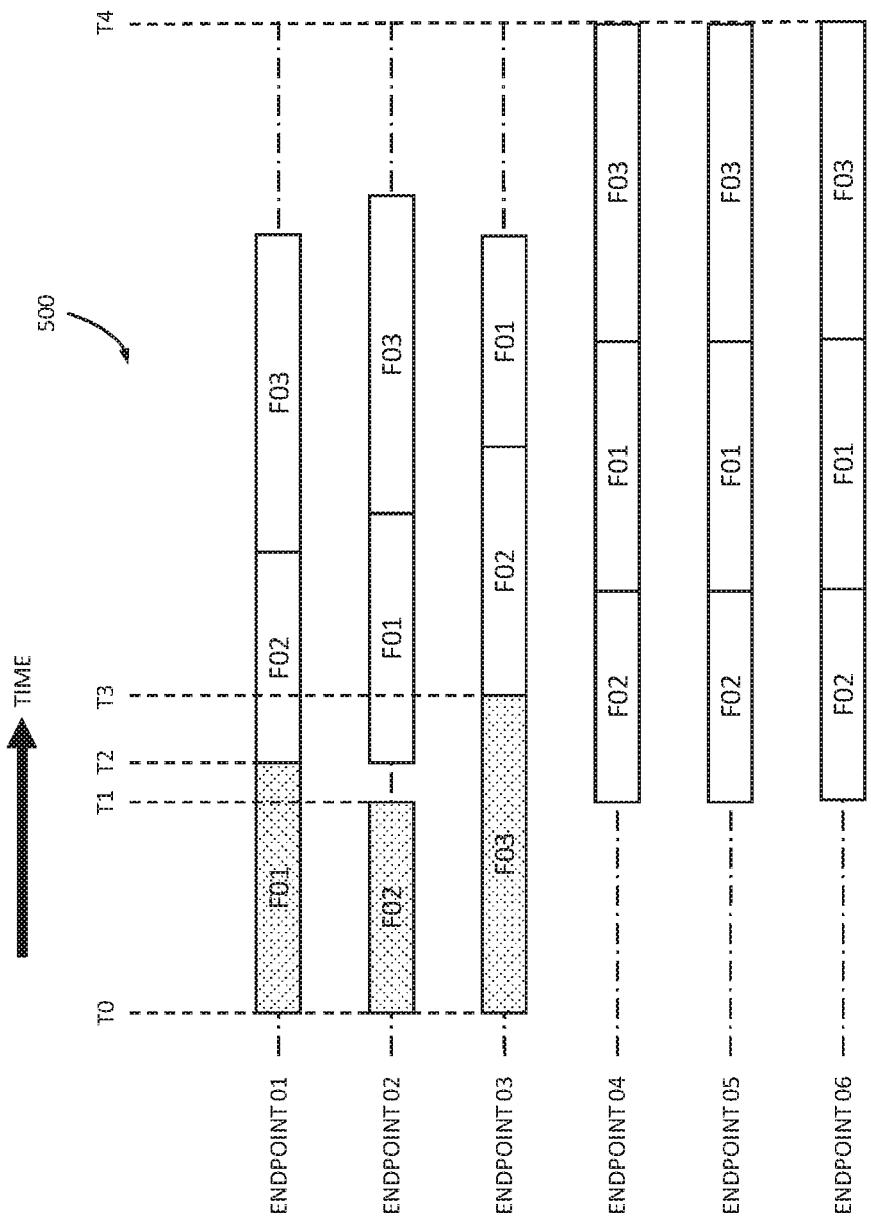
FIG. 5 is a schematic diagram showing scheduling of a content package to a plurality of endpoints.

FIG. 5 shows an example of scheduling a content package according to the method 400 of FIG. 4. In this example, the content package includes three files F01-F03 and is to be distributed to six endpoints E01-E06. Upon receipt of notification that the content package is available from the data center 104, the scheduler assumes that the package is initially not cached in the CDN 114. At this point (time T0) the scheduler instructs three of the endpoints E01-E06 to download files F01-F03 respectively from CDN 114. Typically, the scheduler 118 initially instructs endpoints which are known to have a relatively high bandwidth communications link 112 to the internet, thereby minimizing download time. In the present example, endpoints E01-E03 are known to have high bandwidth communications links (relative to endpoints E04-E06) and are thus instructed to download files F01-F03 respectively. At this stage, files F01-F03 are not stored in the CDN 114 so the CDN 114 proceeds to download and cache the files from the data center 104 for delivery to endpoints E01-E03 respectively.

At time T1, endpoint E02 finishes downloading file F02 from the CDN 114 and sends a message indicating completion to the scheduler 118. Based on the message received from endpoint E02, the scheduler determines that file F02 must now be available in the CDN 114, and proceeds to instruct endpoints E01 & E03-E06 to start downloading the file. At this point, the previously idle endpoints E04-E06 request file F02 from the CDN 114 and start downloading.

At T1, endpoint E01 is still downloading file F01 so it queues the instruction for execution at a later time.

At time T2, endpoint E01 finishes downloading file F01 from the CDN 114 and sends a message indicating completion to the scheduler 118. Based on the message received from endpoint E01 or direct inspection of endpoint E01, the scheduler 118 determines that file F01 must now be cached in the CDN 114, and proceeds to instruct endpoints E02-E06 to start downloading the file. At this stage, endpoint E02 is idle, having finished downloading file F02 earlier at time T1, and therefore starts downloading of file F01 immediately. Similarly, endpoint E01 proceeds to download file F02 based on the instruction from the scheduler which was received at time T1. In contrast, at T2, endpoints E03-E06 are still downloading files so the instruction from scheduler 118 to start downloading file F01 is queued and acted upon once the current download has completed.

At time T3, endpoint E03 finishes downloading file F03 from the CDN 114 and sends a message indicating completion to the scheduler 118. Based on the message received from endpoint E03, the scheduler determines that file F03 must now be cached in the CDN 114, and proceeds to instruct endpoints E01, E02 & E04-06 to initiate downloading. At this time, each of endpoints E01, E02 and E04-E06 are still downloading files so the instruction from scheduler 118 is queued for subsequent execution.

Once the scheduler 118 has instructed downloading of file F03 at time T3, scheduling of the content package is complete (i.e. each of endpoints E01-E06 has been instruction to download each of files F01-F03). In some examples, the scheduler may also continue to monitor the download status for each of the files to each of the endpoints to ensure that the content package is correctly delivered. Thus, in the example illustrated in FIG. 5, the scheduler 118 continues to monitor the download status for each of the files until time T4, at which point is it determined that delivery the content package is complete.

It will be apparent from the example shown in FIG. 5 that the method 400 of FIG. 4 minimizes the amount of data (i.e. the load) on the data center 104. Indeed, in the illustrated example, files F01-F03 are downloaded only once from the data center 104 (indicated by hatched pattern in FIG. 5) and all subsequent requests from the endpoints E01-E06 are fulfilled using copies of files F01-F03 stored the CDN 114.

In this example, the endpoints E01-E06 are configured to queue download instructions received from the scheduler 118 and to download files sequentially. Of course, in some examples, the endpoints may be configured to download two or more files from the CDN 114 in a concurrent manner, if the bandwidth of communications links 112 is sufficient.

Typically, the communications links 112 to the plurality endpoints 106 are typically inhomogeneous in terms of bandwidth and thus the time for each endpoint 106 to download the content package 102 is non-uniform. Thus, in some examples, selection of the endpoint for the initial downloading of a particular files (i.e. the endpoint selected at step 416 in FIG. 4) is performed on the basis of information regarding the relative bandwidth of communications links 112 and the relative size of the particular file. For example, the scheduler 118 may select the endpoint with the highest relative bandwidth to download the file with the largest relative size. Similarly, the scheduler 118 may order the files according to relative size (e.g. large to small) and the select the respective endpoints to download the file in order of observed download speed.

Moreover, although the above examples discuss the content package in terms of one or more files, it will be apparent that the described methods are also applicable to parts of a single a monolithic content package (e.g. a single file). In this case, the content package would be divided into one or more parts (e.g. data blocks) and the plurality of endpoints 106 would download parts of the file in accordance to instructions received from the scheduler 118.

In the examples described above, status of cache 116 in respect of a particular file is modelled by the scheduler 118 on the basis of status messages received from the plurality of endpoints 106. In further examples, the status of cache 116 may be modelled based on instructions issued by the scheduler 118, or using status information obtained by interrogating the CDN 114 directly using an API. Moreover, the scheduler 118 may use a combination of the aforementioned methods to model the status of cache 118, or indeed any other suitable technique.

Figure 6:
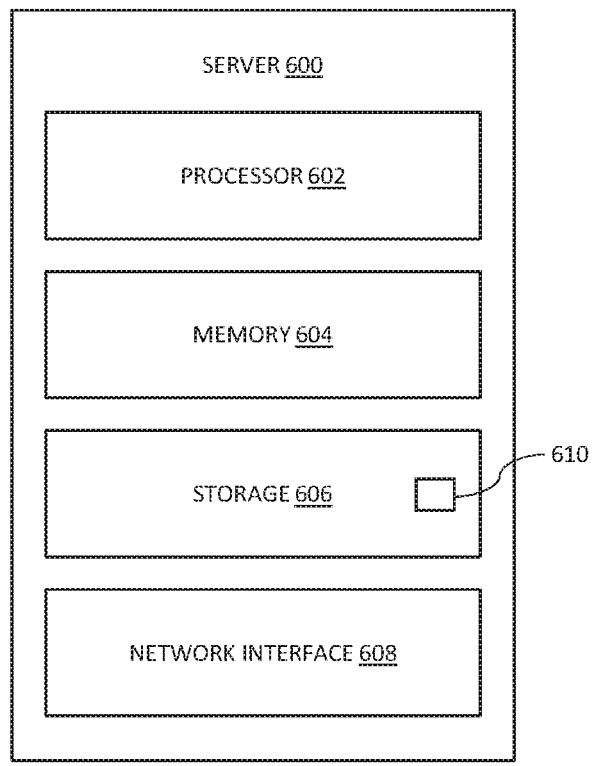
FIG. 6 is a schematic diagram showing an example of a server.

The functionality provided by the scheduler 118 described above with reference to FIGS. 1 to 5 is typically provided by a computer or server that executes computer readable instructions. FIG. 6 depicts schematically an example of a suitable server 600 that includes a processor 602, a memory 604, a storage device 606 and a network interface 608. The processor 602 may include a multifunction processor and/or an application-specific processor, examples of which include the PowerPC™ family of processors by IBM™ and the x86 and x86-64 family of processors by Intel™. The memory 604 within the computer is typically RAM and storage device 606 is typically a large capacity non-transitory storage device such as a magnetic hard disk drive or solid state memory device. The network interface 608 enables communications with other computers, such as endpoints 106, in a communications network using as suitable protocol, such as the Internet Protocol (IP). Storage 606 stores a computer program product 610 which includes computer readable instructions which, when loaded into memory 604 and executed by processor 602, cause the server 600 to perform one or more of the methods described above with reference to FIGS. 1-5.

The above embodiments are to be understood as illustrative examples and further examples are envisaged. It is to be understood that any feature described in relation to any one example may be used alone, or in combination with other features described, and may also be used in combination with one or more features of any other of the examples, or any combination of any other of the examples. Furthermore, equivalents and modifications not described above may also be employed.

What is claimed is:

1. A method of scheduling a download of a content package, the method comprising:
    identifying, by a scheduler communicatively coupled to a server associated with a content provider, a content package for download to a plurality of endpoints via a content delivery network (CDN), the CDN acting in a server-role for a client-server download model between the content provider and the plurality of endpoints, the CDN comprising a plurality of server nodes physically separated from a first endpoint and a second endpoint, the first endpoint physically separated from the second endpoint;
    making a first determination as to whether at least a first portion, representing a predetermined amount of a first part of the content package, is cached in the CDN, the first portion being less than a total size of the first part of the content package;
    instructing, from the scheduler, the first endpoint to download the first part of the content package in response to the first determination indicating that the first portion is not cached in the CDN; and
    instructing, from the scheduler, the second endpoint to download the first part of the content package in response to the first determination indicating that the first portion is cached in the CDN.

2. The method of claim 1, comprising:
    making a second determination indicating whether a second portion, representing at least a predetermined amount of a second part of the content package, is cached in the CDN;
    instructing, from the scheduler, a third endpoint, different from the first and second endpoints, to download the second part of the content package in response to the second determination indicating that the second portion is not cached in the CDN; and
    instructing, from the scheduler, the second endpoint to download the second part of the content package in response to a determination that the second portion is cached in the CDN.

3. The method of claim 1, wherein making the first determination comprises receiving an indication that the content package has been made available for download from a data center containing the server associated with the content provider.

4. The method of claim 1, wherein the first part of the content package is not entirely downloaded to the first endpoint prior to the scheduler instructing the second endpoint to download the first part of the content package.

5. The method of claim 1, wherein the first endpoint is selected from a plurality of endpoints based on a characteristic of a first network link between the first endpoint and the CDN.

6. The method of claim 5, wherein the characteristic is bandwidth of the first network link between the first endpoint and the CDN.

7. The method of claim 1, wherein the second endpoint is connected to the CDN by a second network link, and wherein the first and second network links have different bandwidths.

8. The method of claim 7, wherein the second endpoint is selected from a plurality of endpoints based on the bandwidth of the second network link between the second endpoint and the CDN.

9. The method of claim 1, wherein the content package comprises a plurality of files and the first part of the content package is a file in the plurality of files.

10. The method of claim 9, wherein the content package is a digital cinema package.

11. The method of claim 1, further comprising:
    instructing, from the scheduler, the second endpoint to download the first part from a particular server node of the plurality of server nodes included in the CDN.

12. The method of claim 1, wherein the method is performed by a server which is communicatively coupled to the first endpoint and the second endpoint.

13. A system for scheduling a download of a content package to a plurality of endpoints, the system comprising:
    a server comprising a processor and memory, the server participating in a content delivery network (CDN) logically positioned on a network between a content provider and a plurality of endpoints, the CDN comprising a plurality of server nodes physically separated from a first endpoint and a second endpoint, each of the first endpoint and the second endpoint included in the plurality of endpoints, the CDN configured to function in a server-role for a client-server download model for each of the plurality of endpoints, the processor configured to:
send a first instruction to the first endpoint to download a first part of the content package in response to a determination that at least a first portion, representing a predetermined amount of the first part of the content package is not cached in the CDN; and
send a second instruction to the second endpoint, different from the first endpoint, to download the first part of the content package in response to a determination that the first portion is cached in the CDN, wherein the first portion is less than a total size of the first part of the content package.

14. The system of claim 13, further comprising:
the first endpoint configured to download the first part of the content package from a data center associated with the content provider via the CDN in response to the first instruction from the server; and
the second endpoint, configured to download the first part of the content package from the CDN in response to the second instruction from the server, wherein the first part of the content package is not entirely downloaded by the first endpoint prior to a communication of the second instruction to the second endpoint.

15. A non-transitory computer-readable storage medium having computer readable instructions stored thereon, the computer readable instructions being executable by a computerized device to:
instruct a first endpoint, from a plurality of endpoints, to download a first part of a content package in response to a determination that at least a predetermined amount of the first part of the content package is not available from a CDN, the CDN comprising a plurality of server nodes logically positioned between a content provider and the plurality of endpoints, each of the plurality of server nodes physically separated from the first endpoint and a second endpoint, from the plurality of endpoints, the CDN configured to function as a server in a client-server download model for each of the plurality of endpoints; and
instruct the second endpoint, different from the first endpoint, to download the first part of the content package, in response to a determination that a first portion, representing at least the predetermined amount of the first part of the content package, is available from the CDN, wherein the first portion is less than a total size of the first part of the content package.

16. The non-transitory computer-readable storage medium of claim 15, wherein the first endpoint is connected to the CDN by a first network link, wherein the second endpoint is connected to the CDN by a second network link, and wherein the first and second network links have different bandwidths.

17. The non-transitory computer-readable storage medium of claim 16, wherein the first endpoint is selected from the plurality of endpoints based on the bandwidth of the first network link between the first endpoint and the CDN, and wherein the second endpoint is selected from the plurality of endpoints based on the bandwidth of the second network link between the second endpoint and the CDN.

18. The non-transitory computer-readable storage medium of claim 15, wherein the first part of the content package is not entirely downloaded to the first endpoint prior to an instruction to the second endpoint to download the first part of the content package.

19. The system of claim 13, wherein the first endpoint is connected to the CDN by a first network link, wherein the second endpoint is connected to the CDN by a second network link, and wherein the first and second network links have different bandwidths.

20. The system of claim 19, wherein the first endpoint is selected from the plurality of endpoints based on a first bandwidth of the first network link between the first endpoint and the content delivery network, and wherein the second endpoint is selected from the plurality of endpoints based on a second bandwidth of the second network link between the second endpoint and the content delivery network.

* * * * *